UNITED STATES PATENT OFFICE.

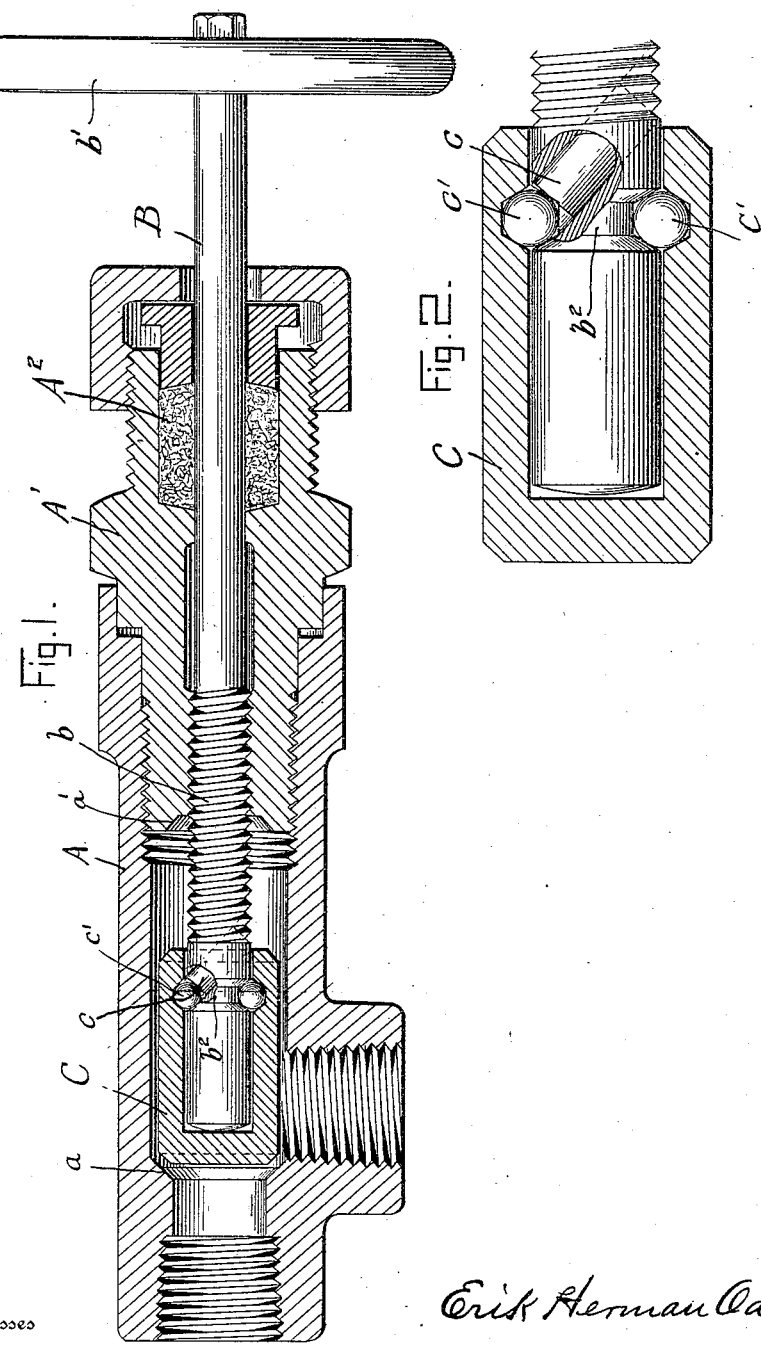

ERIK HERMAN ODERMAN, OF WAYNESBORO, PENNSYLVANIA, ASSIGNOR TO FRICK COMPANY, OF WAYNESBORO, PENNSYLVANIA, A CORPORATION.

VALVE.

1,069,282.	Specification of Letters Patent.	Patented Aug. 5, 1913.

Application filed February 6, 1909. Serial No. 476,471.

*To all whom it may concern:*

Be it known that I, ERIK HERMAN ODERMAN, a citizen of the United States, residing at Waynesboro, in the county of Franklin and State of Pennsylvania, have invented certain new and useful Improvements in Valves, of which the following is a specification.

My said invention consists in certain improvements in valves and relates especially to the manner of mounting the valve-button upon the valve-stem, whereby it will seat easily and accurately and not be affected by the variations in alinement or vibrations of the stem in operation, all as will be hereinafter more fully described and claimed.

Referring to the accompanying drawings which are made a part hereof and on which similar reference characters indicate similar parts, Figure 1 is a longitudinal central section through a valve casing containing a valve of my improved construction, and Fig. 2 a detail longitudinal section on an enlarged scale of the inner end thereof.

In said drawings the portions marked A, represent the casing, B the valve-stem and C the valve-button.

The valve casing A is, or may be, of any approved form and needs no special description. It has an inlet opening and an outlet opening, both internally screw-threaded, whereby they are adapted to be attached in the usual manner to inlet and outlet pipes and between said openings is formed a valve seat $a$. In its outer end it is provided with a gland A′ containing a stuffing box A² through which the valve-stem passes. A seat $a'$ for the upper end of the valve-button is formed at the inner end of said gland around said valve-stem.

The valve-stem B is mounted in said gland A′ by means of a screw-threaded portion $b$ which engages with screw threads in said gland. On its outer end it is provided with a hand-wheel $b'$. Near its inner end it is formed with a circumferential groove $b^2$, forming half of a ball-race. A diagonal perforation leads from outside the button through said stem into said ball-race and a plug $c$ is mounted therein.

The valve-button C is in the form of a thimble and is mounted over the end of the valve-stem and formed with an outer face adapted to seat upon the valve-seat $a$ and an inner face or end adapted to seat upon the seat $a'$ in the inner end of gland A′. It is also formed with a circumferential groove in its internal surface adapted to register with the circumferential groove $b^2$ in said valve-stem and form the other half of the ball-race. As shown most clearly in Fig. 2, the balls are inserted through the diagonal perforation in the stem and the plug $c$ is then inserted. By this arrangement no leakage of steam will be permitted when the outer end of button is seated on seat $a'$, as when stem B is being repacked in stuffing box. The balls being in place and the plug $c$ inserted it will be seen that the button is securely attached to the valve-stem so that they will move together longitudinally but be permitted to rotate freely independent one of the other. By this means any slight vibration in the longitudinal position or alinement of the valve-stem will not interfere with the proper adjustment of the valve upon its seat.

Having thus fully described my said invention, what I claim as new, and desire to secure by Letters Patent, is:

A valve comprising a casing having an inlet and an outlet with a valve-seat between, a valve-stem, a valve-button mounted loosely on the end of said valve-stem, said valve-stem and valve-button having a circumferential ball-race formed partly in each and at a point a distance within said button from its outer end, said stem being formed with a perforation leading therethrough diagonally from a point outside of said button into said ball-race, a plug for the outer end of said perforation, and balls mounted in said ball-race to secure the valve-button on the valve-stem, substantially as set forth.

In witness whereof, I have hereunto set my hand and seal at Waynesboro, Pennsylvania this fourth day of February, A. D. nineteen hundred and nine.

ERIK HERMAN ODERMAN. [L. s.]

Witnesses:
WALTER J. KENT.
CHAS. B. CLAYTON.

Copies of this patent may be obtained for five cents each, by addressing the "Commissioner of Patents, Washington, D. C."